UNITED STATES PATENT OFFICE.

CHARLES M. HIGGINS, OF BROOKLYN, NEW YORK.

ADHESIVE.

SPECIFICATION forming part of Letters Patent No. 576,403, dated February 2, 1897.

Application filed November 12, 1896. Serial No. 611,904. (No specimens.)

*To all whom it may concern:*

Be it known that I, CHARLES M. HIGGINS, of Brooklyn, Kings county, New York, have invented certain new and useful Improvements in Adhesive Compounds, of which the following is a specification.

This invention relates to that class of compounds shown in my former United States patents, Nos. 466,239 and 466,240, of December 29, 1891, in which borax or boracic acid is combined with dextrine and water; and my present invention consists in an improved or novel process of combining the said ingredients, whereby certain advantages are secured, as hereinafter fully set forth and claimed.

In describing my improved process and its product I will first set forth the preferred formula, with the preferred proportion of ingredients.

To one gallon of water use seven pounds of yellow dextrine and one pound of borax. First heat the water to boiling, or nearly so, or from 180° to 200° Fahrenheit. Then shut off the heat and add the dextrine, which will become thoroughly and rapidly dissolved in a few minutes, aided by frequent stirring, the temperature falling gradually at the same time. If desired, the heat may be continued on the solution until all the dextrine is dissolved, but this is not necessary. A lower temperature may be used than that stated, but I prefer a minimum of about 170° to 180°. After the dextrine is fully dissolved allow the solution to cool below 90° Fahrenheit, or preferably 70°. Then add the borax and stir in thoroughly until all is dissolved. The borax may be added in a dry powder or moistened with a little water or in any other suitable way, but I prefer the dry powder, which will soon become dissolved in and combined with the dextrine solution in this way.

In my former patents, where the borax is combined with the dextrine solution at a hot temperature, the solution is made darker in color and more fluid in consistency, and the advantage of the present process is that it produces a solution of lighter color and more viscous in consistency, which can be used for many purposes without requiring any discoloring or clarifying or without requiring any agents to coagulate or thicken the solution, as described in my former patents. It thus seems that where the dextrine has first been combined with the water at a hot temperature, forming, presumably, a hydrate, the borax will then combine with this hydrated dextrine at a cold temperature with the advantages as above stated.

If it is desired to completely discolor and clarify the solution, peroxid of hydrogen may be added thereto, say five to ten volume per cent, as shown in my said Patent No. 466,240, or any other suitable discoloring agent may be used with or without filtering, and as by this process less coloration has been developed by the manner of combining the borax less of the discoloring and clarifying agent will be required, which will be a great gain in economy, as the peroxid is the most expensive ingredient.

If it is desired to further thicken the solution, a caustic alkali may be added thereto, as described in my Patent No. 466,239, but in this case less will be required. I prefer, however, to use alcohol as a thickening or coagulating agent in this case, as alcohol has a more moderate thickening effect than would be the case with the alkali and is better adapted to the more viscous solution which is produced by this process, and has the further advantage that it does not tend to darken the solution, as is the case with the alkali. I prefer to use about two to five per cent. of alcohol, by volume, to the borated dextrine solution, but more or less may be used, the proper range being just sufficient to produce some thickening or coagulation, but not enough to produce permanent precipitation of the dextrine. I prefer to use wood or grain alcohol.

The proportions of dextrine, water, and borax may of course vary according to the consistency desired, whether pasty or liquid, but it is important that the weight of borax used be a large fraction of the weight of the dextrine, say about one-sixteenth or more, one-eighth being the preferred average. Where white dextrine is used, I prefer to use about five to six pounds to the gallon of water, the proportion of borax being relatively the same. The product made with the yellow dextrine, as at first described, will be a viscous mucilage, whereas the product made with the white dextrine will be more or less pasty.

Boracic acid may be used in place of the borax, and if so used only about half the weight will be necessary, that is, where one-sixteenth or one-eighth of borax would be employed only one thirty-second or one-sixteenth of boracic acid need be used. Any other suitable borate or boron compound may be used as equivalent of the borax, but ordinary commercial borax is considered generally the best for the purposes of this invention.

What I claim as my invention is—

1. The described process of making an adhesive compound, viz., dissolving dextrine in hot water and then allowing the solution to cool and then adding borax or its equivalent and causing it to dissolve in and combine with said cool solution, substantially as and for the purpose set forth.

2. An adhesive compound consisting of borax, dextrine and water combined together with alcohol added thereto, substantially as herein set forth.

CHAS. M. HIGGINS.

Witnesses:
  JNO. E. GAVIN,
  HENRIETTA H. NICOLAI.